(12) United States Patent
Liu et al.

(10) Patent No.: US 9,116,847 B2
(45) Date of Patent: *Aug. 25, 2015

(54) SYSTEM AND METHOD FOR HIGH PERFORMANCE ENTERPRISE DATA PROTECTION

(71) Applicant: CATALOGIC SOFTWARE, INC., Woodcliff Lake, NJ (US)

(72) Inventors: Peter Chi-Hsiung Liu, Paramus, NJ (US); Soubir Acharya, Pleasantville, NY (US)

(73) Assignee: CATALOGIC SOFTWARE, INC., Woodcliff Lake, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,993

(22) Filed: Apr. 21, 2014

(65) Prior Publication Data

US 2014/0325267 A1    Oct. 30, 2014

Related U.S. Application Data

(63) Continuation of application No. 13/555,515, filed on Jul. 23, 2012, now Pat. No. 8,706,992, which is a (Continued)

(51) Int. Cl.
*G06F 12/16* (2006.01)
*G06F 11/14* (2006.01)
(Continued)

(52) U.S. Cl.
CPC .......... *G06F 11/1451* (2013.01); *G06F 3/0482* (2013.01); *G06F 11/1453* (2013.01); *G06F 11/1456* (2013.01); *G06F 11/1469* (2013.01);

(Continued)

(58) Field of Classification Search
CPC ............ G06F 11/1451; G06F 11/1453; G06F 11/1456; G06F 11/1469; G06F 11/2074; G06F 3/0482; G06F 2201/84

USPC ................................................... 711/162, 166
See application file for complete search history.

(56) References Cited

U.S. PATENT DOCUMENTS

| 6,085,298 | A  | 7/2000  | Ohran |
| 6,615,365 | B1 | 9/2003  | Jenevein et al. |
| 6,832,330 | B1 | 12/2004 | Boudrie et al. |
| 6,931,558 | B1 | 8/2005  | Jeffe et al. |
| 7,093,086 | B1 | 8/2006  | van Rietschote |
| 7,191,299 | B1 | 3/2007  | Kekre et al. |
| 7,254,682 | B1 | 8/2007  | Arbon |

(Continued)

FOREIGN PATENT DOCUMENTS

| WO | 02097624   | 12/2002 |
| WO | 2005017737 | 2/2005  |

*Primary Examiner* — John Lane
(74) *Attorney, Agent, or Firm* — Hughes Hubbard & Reed LLP

(57) ABSTRACT

High performance, enterprise-level data protection system and method provides efficient block-level incremental snapshots of primary storage devices, and instant availability of such snapshots in immediately mountable form that can be directly used in place of the primary storage device. Related systems and applications are described, including an "Enterprise Image Destination" (EID) for backup images; a mirroring technique whereby a replacement physical primary facility may be created while working with a second storage unit as the primary source file system; and a technique for eliminating redundant data in backup images when multiple systems with partially common contents (e.g., operating system files, common databases, application executables, etc.) are being backed up. A number of examples showing "Fast Application Restore" (FAR) with the use of the invention are also provided.

2 Claims, 5 Drawing Sheets

Related U.S. Application Data continuation of application No. 13/070,667, filed on Mar. 24, 2011, now Pat. No. 8,255,651, which is a continuation of application No. 11/993,634, filed as application No. PCT/US2006/024478 on Jun. 23, 2006, now Pat. No. 7,937,547.

(60) Provisional application No. 60/693,715, filed on Jun. 24, 2005.

(51) Int. Cl.
   *G06F 3/0482* (2013.01)
   *G06F 11/20* (2006.01)

(52) U.S. Cl.
   CPC ............ *G06F 12/16* (2013.01); *G06F 11/2074* (2013.01); *G06F 2201/84* (2013.01)

(56) References Cited

U.S. PATENT DOCUMENTS

| | | |
|---|---|---|
| 7,266,655 B1 | 9/2007 | Escabi, II et al. |
| 7,322,010 B1 | 1/2008 | Mikula |
| 7,565,517 B1 | 7/2009 | Arbon |
| 7,937,547 B2 | 5/2011 | Liu et al. |
| 8,255,651 B2 | 8/2012 | Liu et al. |
| 2003/0131278 A1 | 7/2003 | Fujibayashi |
| 2003/0182322 A1 | 9/2003 | Manley et al. |
| 2004/0024961 A1 | 2/2004 | Cochran et al. |
| 2004/0139128 A1 | 7/2004 | Becker et al. |
| 2004/0243775 A1 | 12/2004 | Coulter et al. |
| 2004/0250033 A1 | 12/2004 | Prahlad et al. |
| 2004/0268068 A1 | 12/2004 | Curran et al. |
| 2005/0108302 A1 | 5/2005 | Rand et al. |
| 2006/0112151 A1 | 5/2006 | Manley et al. |
| 2006/0112219 A1 | 5/2006 | Chawla et al. |

SYSTEM AND METHOD FOR HIGH PERFORMANCE ENTERPRISE DATA PROTECTION

CROSS-REFERENCE TO RELATED APPLICATIONS

This application is a continuation of U.S. patent application Ser. No. 13/555,515, filed Jul. 23, 2012, which is a continuation of U.S. patent application Ser. No. 13/070,667, filed Mar. 24, 2011, which is a continuation of U.S. patent application Ser. No. 11/993,634, filed Dec. 21, 2007, which is a National Stage Entry of PCT/US2006/024478, filed Jun. 23, 2006, which claims priority from U.S. Provisional Application No. 60/693,715, filed on Jun. 24, 2005. The entire disclosure of said applications is hereby incorporated by reference. This application also incorporates by reference the entire disclosure of the commonly invented and commonly assigned application entitled "System And Method for Virtualizing Backup Images", application Ser. No. 11/993,643, filed Dec. 21, 2007, published as U.S. Patent Publication No. 2009/0222496 A1 (Sep. 3, 2009).

BACKGROUND OF THE INVENTION

1. Field of the Invention

The present invention is in the field of information technology, and more particularly relates to high performance, enterprise-level backup and disaster recovery systems.

2. Description of Related Art

Recent events have proved that the need to recover quickly from disasters (both man-made and natural) is critical. Enterprise-level backup and disaster recovery systems are directed at this need. Under the current state of the art, the typical end product of a backup operation is a backup volume that must go through a relatively lengthy "restore" process before it can be used in production.

There do exist some "short downtime" backup and recovery solutions, but they generally require expensive server clustering and/or replication capabilities.

The state of the art with respect to the present application is documented in the publications of the Storage Networking Industry Association ("SNIA"), which are accessible online at www.snia.org. See in particular "Examination of Disk Based Data Protection Technologies" by Michael Rowan, of Revivio Corporation; "Identifying and Eliminating Backup System Bottlenecks" by Jacob Farmer of Cambridge Computer Corporation; "Technologies to Address Contemporary Data Protection" by Michael Fishman of EMC Corporation; and "Next Generation Business Continuity" by Andrea Chiaffitelli of AT&T Corp. (each of which references is incorporated by reference).

As will be appreciated from a review of the references cited above, the current state of the art does not provide a method short of large-scale server clustering and/or replication for making recent point-in-time snapshots of a system available for use on an immediate basis in the event of a system failure or disaster.

It would be desirable, therefore, to have a system implemented with simple hardware that provides the capability so that an organization at any given time could have a recent set of self-consistent images of its production servers available that, in the event of a system failure or disaster, could be brought online and into active production on a more-or-less instantaneous basis.

SUMMARY OF THE INVENTION

An embodiment of the present invention is being made available as part of Backup Express® (BEX), a software product of Syncsort Incorporated, the assignee of the present application. Among other capabilities, the present invention, as implemented in Backup Express, provides a service called "Fast Application Recovery" (FAR), which makes possible near instant recovery from failure using simple hardware well within the IT budgets of most businesses.

It is an object of the present invention to provide a high performance, enterprise-level data protection system and method providing efficient block-level incremental snapshots of primary storage devices, and instant availability of such snapshots in immediately mountable form that can be directly used in place of the primary storage device.

Among other objects of the invention are the following:
  providing an enterprise repository for such snapshots adapted to facilitate the methods described herein on a variety of storage platforms.
  providing the ability create a replacement physical primary facility in real time while working with another storage unit as the primary.
  providing the ability to eliminate redundancy in multiple backups and/or in a single file system by means of block level comparisons.

In one embodiment, the instant availability aspect of the invention is provided by:
  a) providing a base-level snapshot, stored on a secondary system of the source ("primary") file system;
  b) providing a block-level incremental snapshots of the primary system, stored on the secondary system, representing only the blocks that have changed since the prior snapshot; and
  c) constructing a logical disk image from at least one of said incremental snapshot images that can be used directly as a mounted storage unit (the incremental snapshot in step b having been constructed in a manner that facilitates the immediate performance of this step on demand).

The snapshotting and instant availability features of the invention are used in connection with storage hardware components to provide an "Enterprise Image Destination" (EID) for backup images created in accordance with the present invention. The EID software is further distinguished in being operable with storage hardware from a wide variety of vendors, including inexpensive ATA storage hardware. A "Double Protection" feature is provided whereby point-in-time images in the EID may themselves be backed up to selected media or replicated in other EIDs.

The invention also provides a feature, referred to as "lazy mirroring," whereby a replacement physical primary facility may be created while working with a second storage unit as the primary source file system. The second storage unit in accordance with this feature could be a secondary logical volume previously brought online pursuant to the "instant availability" feature of the invention referenced above, where a replacement physical primary volume is being created at the same time; or it could be (as another example) a surviving unit of a mirrored storage system where another mirror unit is being "resilvered" or replaced at the same time. Other applications of the "lazy mirroring" technique are possible as well. In any such application, the "lazy mirroring" in accordance with the invention is further characterized by being able to proceed without an interruption in processing.

Finally, the invention provides a technique based on block comparisons for greatly speeding up distributed backup operations by eliminating redundant data when multiple systems with partially common contents (e.g., operating system files and common databases) are being backed up. Where it is determined that a block to be backed up already exists in the backup set, the existing block is used in the directory or catalog of the backup, rather than storing both blocks. A similar technique is employed so as to eliminate redundant blocks in a file system.

Other objects and advantages of the invention will be clear from the drawings and the detailed description which follows.

DETAILED DESCRIPTION

Figure 1:
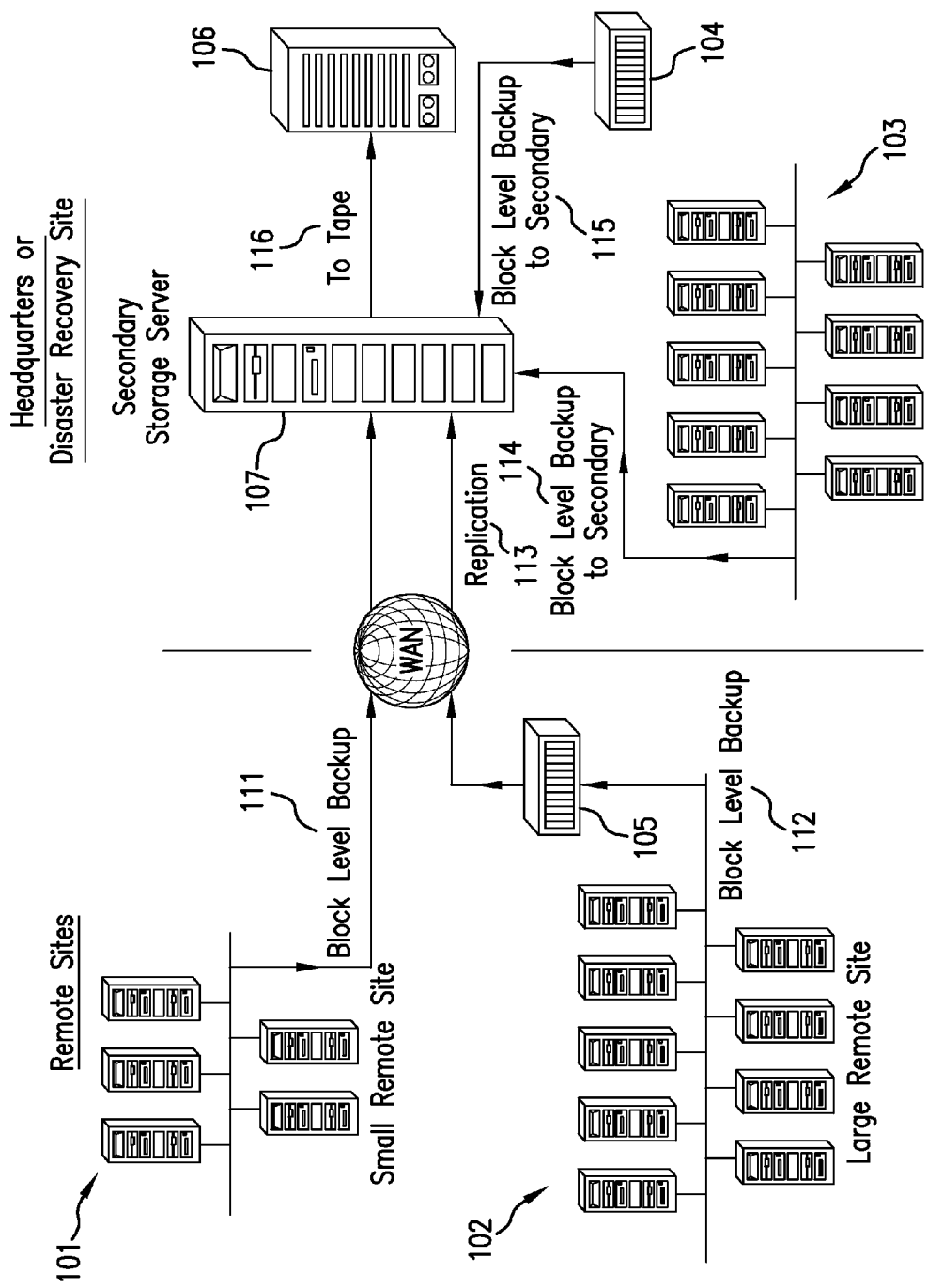
FIG. 1 is a high level system block diagram showing a typical enterprise deployment of an embodiment of the invention.

The following is a description of several preferred embodiments of various aspects of the invention, showing details of how systems may be constructed to carry out the invention, and the steps that can be employed to utilize such systems and to practice such methods. These embodiments are illustrative only, and the invention is by no means limited to particular examples shown. For example, certain preferred embodiments are described in relation to an implementation with specific storage hardware and operating systems, but it should be appreciated that the disclosure that follows was intended to enable those skilled in the art readily to apply the teachings set forth to other storage hardware and operating systems. The specific features of any particular embodiment should not be understood as limiting the scope of what may be claimed.

DEFINITIONS

The following terms have a defined meaning as used in this application:

APM (Advanced Protection Manager): A name used for a suite of products that implement an embodiment of the present invention.

APM2D (Advanced Protection Manager to Disk): An umbrella term covering presently available secondary devices, and future solutions in a system that provides forever block level incrementals and Instant Availability.

Application: A mass produced (i.e., generally commercially licensed) back-end to a business application (usually a database) that is protected by backup. This is distinct from (and should not be confused with) the end user application.

Application Instance: A logically separate incarnation of an application co-existing with other instances on a physical machine. An application instance is the target for FAR.

Backup Client: Client software that provides block-level incremental backup for high-speed backup with virtually no impact on other operations. Accesses the disk directly, bypassing the file system for extremely fast, efficient image-based backups. Backup Clients are also provided for block-level incremental backup of Exchange 2000/2003 and SQL Server 2000 databases.

BAR (Backup After Restore): The first backup after restore is also an incremental and is tied to the original base.

EID (Enterprise Image Destination): Nearline destination and repository for application-aware Forever Image Incrementals.

EOFM: —OEM version of snapshot driver from St. Bernard for Windows.

ERF (Eventual Rapid Failback) for Applications: It may be desirable to failback the application from the target node for FAR back to the original or newly designated home node for the application. This is performed rapidly, seamlessly with minimum application downtime.

ExpressDR: Provides simple, robust one-step bare metal recovery for client nodes from routine daily backups. Can also be used to deploy a complete system image to multiple machines.

Express Image: Utilizes block-level technology for high-performance backup of systems to tape or storage-independent disk. Provides exceptional performance gains for high-volume backups with many small files.

FAR (Fast Application Recovery): Fast Application Recovery is the ability to bring an application on-line quickly on a stand-by or original server by attaching to virtual storage created out of backup images on a NAS device.

Filer: a NAS device.

Forever Image Incrementals (also, "Forever incrementals" and "Forever block-level incrementals"): The ability to seed base level back and then schedule incremental, block-level backups forever thereafter.

Instant Availability: Enables rapid mounting of backup data sets as read/write volumes. Provides near-instant recovery of critical applications and data without transferring data.

iSCSI: TCP/IP based protocol for storage. Low cost alternative to fiber channel for making remote storage on an IP network accessible to any authenticated initiator node.

iSCSI mapping and Unmapping: The process of iSCSI login to the filer makes LUNs on the filer visible as local storage on the restore target node. iSCSI logoff undoes this process and removes these disks.

LAR (Life After Restore): This is a combination of ERF and Backup of the FAR volumes if there is business value in protecting the FAR volumes.

LUN Cloning: A feature of NAS filers which allows snapshot backed LUNs to be freed from the backing snapshot and transition to a normal LUN. The LUN can be used by applications while this process completes. The snapshot can then be deleted and the LUN has independent existence.

LUN Creation: A feature of a NAS filer carving virtual storage out of backup images stored in snapshots. These LUNs can then be mounted read-write on the restore target. Reads are satisfied from the snapshot while writes are directed to a separate persistent area. The original backup image does not change.

Online/Background Restore: Automatic background copying of image data from iSCSI drives to a local disk slice, following FAR, while the application remains online. This is done un-obtrusively in the background while the application is up and running A short synchronization is needed at the end when the application is quiesced or restarted and the iSCSI drive unmapped. At the end of the process all data is local. No penalty is paid in terms of application outage or downtime while data transfer happens.

PIT Images: Point in time Images of application volumes, frozen at the time of backup.

Protocol director: Controls and manages the execution of jobs employing a block-level application-consistent protocol.

Secondary Storage: Distinct from primary storage (which is where production data resides) this is the destination for backup as well as the bedrock for LUNs that form virtual machine disks. Only changes require additional storage, thus little secondary storage beyond what is necessary for backup is needed. This storage may be Write Once Read Many (WORM) to support un-alterable content retention to meet legal requirement.

Specialized Backup Software: This creates backup images capturing incremental changes and preserving points in time in the past on secondary storage. Backup software creates application consistent images and additionally captures machine configuration including persistent and volatile state.

Application Manager: Manages all block-level application consistent backup operations from an easy-to-use, browser-based GUI. Supports backup of NAS devices plus Windows, UNIX, and Linux nodes. Also displays SQL and Exchange volumes and databases in the GUI for selectable backup and restore. All backups and other operations are tracked in a single catalog.

Stand-by Node/Alternate Node/Preventive Setup: A machine with minimal hardware and default application installation which could be the target for FAR for high availability or verification reasons. Depending on business need this mode could also be a powerful machine capable of running applications on a permanent basis.

Volume: Unit of backup, a single file system comprising many files and directories that are backed up at the block level.

End to End Protection with Enterprise Image Destinations

Enterprise Images Destinations are a part of the APM (Advanced Protection Manager) suite of products. This feature is implemented entirely in software and once installed on a node would allow that node to function as a nearline destination for application aware Forever Image Incrementals. This EID node could be configured in various ways (local disks, iSCSI storage etc.) to offer various degrees of protection and reliability. Image backups from various nodes would be consolidated, nearlined and versioned on this device. Instant Availability for file-systems and applications would be leveraged off these versioned images.

FIG. 1 shows a typical enterprise deployment of an embodiment of the invention, showing a secondary storage server 107 utilizing inexpensive SATA disk drives, connected in turn to further arrays of servers 103, NAS device 104, a remote secondary storage device 105 and tape storage 106. This backup arrangement is used to remotely manage backup and recovery for networks comprising both small (101) and large (102) remote sites. Block level backup clients are used to perform block level backup operations where indicated (111, 112, 114, 115). Replication to tertiary storage 113 (wherein secondary storage server 107 also serves as a tertiary storage) and tape 116 (to tape drive 106) are also shown. The various elements and backup steps shown in FIG. 1 will be further discussed in the sections of this disclosure that follow.

Architecture:
 Basic:
 The EID node would have locally attached SATA drives configured as hot-pluggable RAIDS. This storage would be used as a repository for images. Versioning would be implemented via snapshots available on the system (VSS for Win2003 or LVM/EVMS for Linux). Images would be exported as read-write LUNs via bundled iSCSI target software.

Thin:
 The EID node would only have a small local drive (ideally mirrored) to hold the OS and EID software. A back-end iSCSI storage array (or similar network intelligence) would be used as the actual destination for backup images. A storage array would necessarily need to expose LUN creation, snapshot creation, LUN cloning, LUN masking/un-masking features to be a candidate for participation in a bundled EID solution. VSS/VDS or SMI-S APIs may be used to standardize on the interface between EID software and external storage.

Thin Shared:
 This is a variation of the above where the networked storage array is shared between the source machine(s) and the EID node. Backups can be optimized in this configuration by sharing a snapshot between the source and destination. The EID node would act as a backup head in this configuration.

EID with Double Protection:
 Backups need to be protected via further backups to tape or disk. This is termed Double Protection. (See "Double Protection" below) First backups to disk on EID nodes could go to tape devices on the SAN or other disk distinct from the storage where the first backups reside. This would be second or third tier storage residing on the SAN or attached to some remote appliance (possibly another EID node). Thus EID is the key enabler for an End-to-End solution for data protection based on multi-tiered storage.

Configuration:
 APM Client Node:
 These nodes would be configured with the APM client and support for multiple snapshot providers (if available). The APM client would be capable of backing up EID targets to secondary storage, which can be to vendor-supplied storage hardware or generic ATA storage hardware. The snapshot support could be basic (bundled EOFM) or complex—each volume may have a separate snapshot provider. (When multiple snapshot providers are present, their use must be pre-configured or indicated by the EID node) Application support when implemented is available simultaneously for both secondary and EID targets.

APM Server—EID Node:
 This node would have the EID software installed with a storage specific plug-in depending on the back-end iSCSI storage (if any). The plugin configuration would be hardwired during installation along with licensing information. The basic configuration would be supported on two different set of commodity OSs—Windows 2003/NTFS and Linux 2.6 with ext3fs/xfs with LVM/EVMS. The requirement essentially is 64-bit journaling file-system with sparse file support with multiple persistent snapshots. Any system meeting these criteria could be a candidate for an EID node. (Additional properties of the file-system like compression and/or encryption although not essential could be employed to provide additional features at additional complexity and/or overhead)

Figure 2:
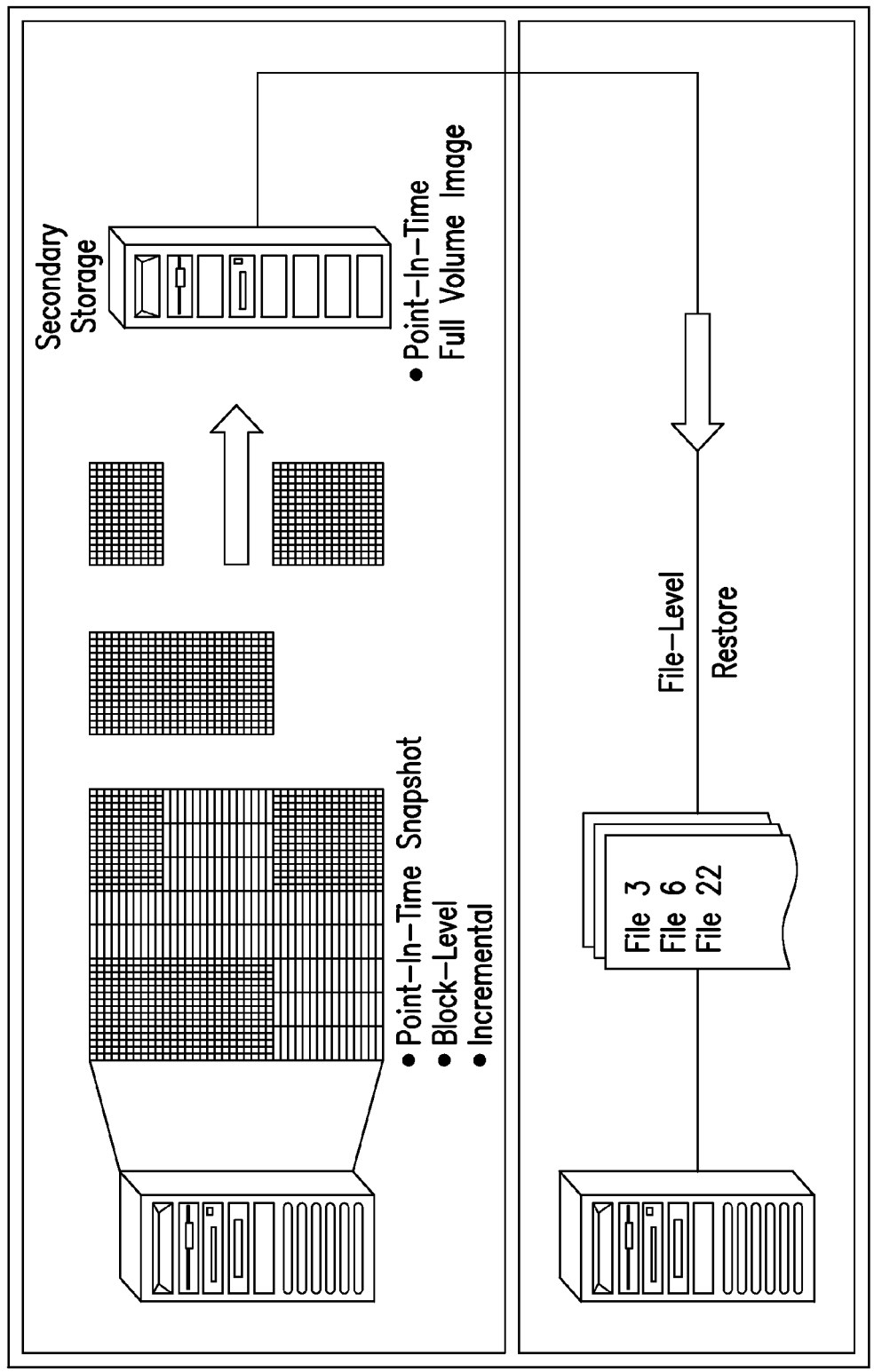
FIG. 2 is a block diagram showing block-level backup data transfer and file-level restore.

Backup Flow:
 FIG. 2 schematically illustrates the creation of a point-in-time snapshot, block-level incremental backup, and point-in-time full volume image, as well as a file-level restore operation.

Snapshot Phase:
 The Protocol director contacts APPH (Application Helper, which mediates application (SQL Server, Exchange, etc.)-specific interaction at the beginning and end of backup) with BACKUP_PREPARE. APPH contacts the Snapshot Handler, which encapsulates snapshot code and incremental block tracking interfaces, to snapshot a set of volumes and flush change journals. The Snapshot Handler would do DISCOVER_LUNS as part of file system discovery. On detecting that some LUNs are back-ended by supported iSCSI (or FCP (Fibre Channel Protocol)) vendors it would invoke a vendor specific method to take a snapshot of the set of volumes that reside on the same iSCSI storage entity (for example a volume containing a set of LUNs on a storage device). A specialized provider would exist per storage vendor providing this functionality or VSS or SMI-S providers could be used if available from the storage vendor. Additional configuration information will be required per back-end storage node to provide this functionality, which would have to be obtained from the database. (This information may be cached or saved as part of a local configuration file.) Since most external providers would not provide change journal support both external (or VSS mediated), a bundled EOFM snapshot would need to be taken. The EOFM snapshot would solely be used for flushing the change journal and tracking changed blocks. The external snapshot would represent the real backup instance or a consistent source for remote copy. The EOFM snapshot needs to be taken first, followed by the external snapshot to produce a consistent image. A small window exists between both snapshots where blocks may change. Since applications are already quiesced (application state has been mediated via APPH so that the application knows that backup has started and has flushed its transactions to disk) no I/O should be generated for them. No file-system meta-data should change either (File systems are capable of recovering to a crash consistent state at any event). An individual file may have blocks changed which would not be captured till the next incremental. Note that the window is small and the odds of an unsupported application having an inconsistent state are extremely small.

APPH would at the end of the process create a content file for the backup specification. This file will be augmented with vendor specific info with possibly a logical name and a persistent snapshot id along with a local snapshot volume created by EOFM, VSS or third-party provider.

Data Transfer:
SVH contacts the EID software with a CREATE_RELATIONSHIP message (for the first backup) and passes the content file as the source path.

The EID software on the EID node then establishes connection with corresponding software ("Node software") on the source node and passes the content file path. The Node software on the source side then reads and passes the contents of the content file back to EID software on the EID node.

Variation I: Shared Snapshot=Backup

The EID software examines the vendor specific snapshot info and determines whether the vendor is supported and licensed. If the answer is yes the EID software tries to determine via local query snapshots existing on the shared storage device and if it determines the shared snapshot can be used as backup then the process completes. The allocation bitmap is also obtained at this point. The EID software stores the relationship, a combination of the source node+source drive(or unique id)+destination node+lun name in its local database. The allocation bitmap is also saved indexed by snapshot id.

Snapshot on the EID Node:
The CREATE_SNAPSHOT from SVH returns with the shared snapshot in the previous step.

Error Recovery:
Not needed for this scenario.

Restart after Cancel:
Not required as the backup should be very quick.

File History:
File history is generated (optionally) on the EID node using the backup LUN. The File history is to be conveyed to Backup Express Master server in some implementation specific way.

Incremental Backups:
These proceed in the same way as base backups except for the fact that the change journal is passed in its entirety to the EID node, which then stores the CJ in its local database indexed by the snapshot id.

Checksums:
Checksums may be calculated for all allocated blocks on the LUN image and saved away in the EID database indexed by snapshot id. Checksums are important for three reasons:
1. Ability to verify after write.
2. Aid in reliable check-point re-start.
3. Ability (albeit at increased cost) to do incremental backup with block level tracking.

APPS:
The APPS volume comprises files generated on the live file-system after the snapshot is taken and as part of the POST_BACKUP event. These files do not exist in the shared snapshot. These files need to be independently backed up. Variation II 'Local Copy To Backup LUN' has to be used in this case. Although APPS appears as a virtual volume, the backup of APPS is effected by copying whole files (file by file backup) and not volume-oriented block copy.

Variation II: Local Copy to Backup LUN
If the EID software determines that the shared snapshot cannot be used, it creates a backup LUN on the iSCSI storage or locally, naming it uniquely with the source node+drive id combination. The hostname+portid+targetname+lunid is returned to the source EID software as part of the initial handshake.

The source side Node software then calls MAP_LUN (which indirectly uses iSCSI login) with the information passed from the EID node. MAP_LUN exposes a device mapped to the local namespace. The Node software begins to copy allocated blocks from the local snapshot of the device to the iSCSI-mapped device. During this process it passes status/checksums/progress to the EID Software via the already established channel.

Snapshot on the EID Node:
The EID software takes a snapshot of the backup LUN or some covering entity and returns the snapshot id.

Error Recovery:
Should not be needed since iSCSI connections for data transfer are reliable and have built in recovery and error connection. The EID software should be able to recover from errors on the control connection transparent to DMA.

Restart after Cancel:
This needs to be implemented. The EID software needs to remember the last successful block written and pass this on during the initial handshake indicating that this is part of re-starting an aborted backup.

File History:
File history is generated (optionally) on the EID node using the backup LUN. The File history is to be conveyed to Backup Express Master server in some implementation specific way.

Incremental Backups:
These proceed in the same way as base backups except for the fact the change journal is used locally to copy only changed blocks on to the backup LUN as part of the process.

Checksums:
Checksums may be calculated for all allocated blocks on the LUN image and saved away in the EID database indexed by snapshot id.

APPS:
The APPS volume comprises files generated on the live file-system after the snapshot is taken and as part of the POST_BACKUP event. These files do not exist in the backup snapshot. After the APPS LUN has been mapped locally, it has to be formatted as a locally recognized file system. Then APPS directories/files are copied whole (file by file) from APPH directed locations (and not from a snapshot) onto the APPS backup LUN. During incremental backups the APPS LUN has to be cleared and a new set of APPS files copied. (The older snapshots would retain the previous versions of APPS files)

Variation III: Network Copy

Like Variation II if the EID software determines that the shared snapshot cannot be used, it creates a backup LUN on the iSCSI storage or locally, naming it uniquely with the source node+drive id combination. LUN creation may fail if it is not supported on this node (really basic configuration) If this happens hostname+portid+targetname+lunid is not returned to the source Node software as part of the initial handshake and Variation III is indicated.

If Variation III is indicated or there is no iSCSI or other means of LUN mapping support on the source node then source side Node software begins to read allocated blocks from the local snapshot of the device and send it across the network to the destination EID software. The destination EID software reads from the channel and writes out a sparse file on some pre-defined volume on the destination. Either end in this process may generate checksums.

Snapshot on the EID Node:

The EID software takes a snapshot of the volume containing the backup image file and returns the snapshot id to the DMA.

Error Recovery:

Needed to recover from network outages via checkpoints kept on the destination.

Restart/Restart after Cancel:

This needs to be implemented. The EID software needs to remember the last successful block written and pass this on during the initial handshake indicating that this is part of re-starting an aborted backup.

File History File history is generated (optionally) on the EID node using the backup image.

Incremental Backups:

These proceed in the same way as base backups except for the fact the change journal is used locally to read only changed blocks and then transfer them over the network on to update the backup image on the destination.

Checksums:

Checksums may be calculated for all allocated/changed blocks on the backup image and saved away in the EID database indexed by snapshot id.

APPS:

Then APPS directories/files are read whole (file by file) from APPH directed locations (and not from a snapshot) and copied across the network to the destination EID software where a directory structure (under a pre-determined backup directory location) is created to reflect an identical copy of the files at the source. During incremental backups the APPS directory has to be cleared and a new set of APPS files transferred and re-created from the source. (The older snapshots would retain the previous versions of APPS files)

Plug-in Architecture for External LUN/Snapshot Management:

EID backups depend on snapshot creation, LUN creation, LUN cloning etc. Both the source side and the EID side of the backup process are consumers of these services. To facilitate easy architectural separation and be able to plug-in various vendors an interface with an associated vendor specific provider (in the form of a DLL or a shared library) needs to be implemented. The default implementation would use the bundled iSCSI provider on the EID node, but could be replaced by a vendor specific implementation if warranted. The interface would provide generic LUN creation/deletion, LUN cloning, snapshot creation/deletion functionality. An augmented version of the interface might add functionality for block level mirroring and other salient features (for example: a Secondary to Tertiary Replication feature), which may be taken advantage of for supporting efficient/elegant Double Protection methodology.

EID Database:

A small database on the EID node is needed to maintain configuration (like back-end iSCSI storage), licensing, snapshot ids, checksum info etc. This would be especially necessary where the EID node is back-ending some iSCSI/shared SAN storage. Backup Express infrastructure would be dealing with a unique snapshot-id, but the EID software has to translate this to an exact network entity by de-referencing the snapshot-id via the local database.

A simple implementation may be a set of directories named with snapshot ids containing block allocation bitmaps, incremental bitmaps, checksums, file history etc.

Double Protection to Tape:

This will be done via a regular NDMP (Network Data Management Protocol) backup re-directed to job handler from SSSVH. (Refer to the separate discussion Double Protection) The important thing to note about DP to Tape is that a full/complete image of a first backup is created on tape. Subsequent tape backups are full copies of other first backup instances. No notion of incrementals or in any other way relating one tape backup image to another is part of this design.

Double Protection to Disk:

Double Protection to disk (DP2D) prolongs the life of a backup image on disk further by creating another backup on disk of the original/first backup. Every effort is made in this case to create subsequent backups by transferring incremental data to update tertiary backups. Various scenarios are:

Multi-Tiered Storage Visible to EID Node:

In this scenario the tertiary disk storage is accessible from the EID node (Secondary and Tertiary storage may be part of a large multi-tiered storage deployment accessed via a uniform single vendor interface—Hitachi TagmaStore). DP backup in this case would proceed via a local block-level incremental copy performed by the EID software after the appropriate tertiary location is selected and a LUN un-masked/mounted on the local EID node.

Block Mirroring Between Single Vendor Nodes:

In the case a vendor has an efficient and appliance implemented block mirroring method for transferring data between secondary and tertiary nodes, the EID software would trigger and image transfer/update via vendor specific API set to create a Double Protection backup.

EID Node to EID Node:

When tertiary storage is physically separated from the EID node, the remote EID node would initiate the backup via "Network Copy" to pull data from the local EID node.

EID Node to Secondary:

When data has to be transferred between an EID node and a secondary node, the applicable Backup Client transfer method would be used, i.e. the secondary would be contacted and asked to pull data from the EID node. The EID Software would recognize a DP2D backup and update the secondary image from appropriate (usually latest) snapshot using saved bitmaps.

Backup Mechanism:

Once a double protection job is created for protecting first backups, the Protocol director initiates an EID backup, much like a regular EID backup except that the snapshot phase is skipped.

A CREATE_RELATIONSHIP is sent to the destination EID software (this could be an EID node co-located with the destination, a remote EID node, or another type of secondary). If the EID software detects that it is the source node for the backup, it uses appropriate mechanism to either copy the image locally (using allocated or incremental bitmaps saved with the backup) to a tertiary destination or invoke a vendor specific method to affect this transfer. If the EID software detects that the source is remote it initiates a regular EID backup using a previously described mechanism. The backup is saved on the destination EID node like a regular EID backup, implying that this process can be cascaded indefinitely.

The snapshot-id, which comes back from the NOTIFY response to secondary snapshot creation, is cataloged as part of the DP backup and linked with the original first backup. (For detailed explanation see the separate discussion of Double Protection.)

Restore from Double Protection Backups:

Refer to description of Double Protection.

Restore Browse:

When file history is generated at the end of backup on the EID node and incorporated into the Backup Express database, browsing happens normally via the catalog browse function of the dB. When file history is not generated (when generating file history is computationally intensive or would require too much storage) the NDMP Directory Browse function may be used by contacting the EID software. Browsing may be provided by mounting the backup LUN on the EID node and then browsing the file-system using existing 'snap dir list' mechanism or by generating 'rawtoc' from the image file when browsing is necessary. Double Protection to tape requires that file history be generated during a Double Protection operation either as part of the image or to construct a file-by-file archival format if the option to mount the LUN as a recognizable file system is not available.

Restore Flow:

Directory/File Restore:

Once the restore selection has been generated (either by the user or by the Protocol director after the backup document for the instance has been translated by APPH from application objects to files) and a content file has been created SSSVH contacts the Node software on the restore target passing it the content file, which EID node to get the data from, path and snapshot id on that node. The Node software on the restore target then contacts the EID software passing it the restore path and the snapshot id. Once the EID node examines this information it makes a determination of whether the snapshot-id & volume combination can be exposed as a LUN on the restore target. If this is possible (much like backup) a LUN is created by the EID node, either locally or on shared SAN storage and hostname+portid+targetname+lunid is passed to the restore target. (Note: hostname may not be the same as the EID node) Once the Node software on the restore target is able to map this LUN the handshake completes. For Instant Availability this essentially completes the restore process. Otherwise the Node software does a local copy of files/directories from the mapped LUN to the restore target locations. (Note: This is exactly like how APPS files are logically backed up)

Fallback:

It is possible that EID node determines that LUNs cannot be exposed to the requesting node (e.g., for security reasons) or that after the initial handshake completes the requesting node cannot map the LUN. In this situation (a low priority) a traditional restore proceeds where the EID software reads the requested files from the backup image and sends them over the network and the Node software on the restore target recreates the file locally from the received data. In this situation 'rawtoc' is required, either pre-existing from a post backup process or created on the fly for restore (and then cached if desired).

Error Recovery/Restartability:

This is unnecessary for LUN mapped/IA style restores but may be useful for traditional restores (if that is implemented at all)

Instant Availability Restore:

As in other block-level restores MAP_LUNS will be called (as implemented in the Snapshot Handler) to map a set of volumes via iSCSI or FCP on the restore target from the selected snapshot. The Snapshot Handler will call CREATE_LUN_FROM_LUN on the EID node to create and expose a LUN within a snapshot. The APPS volume will then be similarly mapped to the local namespace either via a local iSCSI mount or a network mount. Once this step completes SSSVH will direct APPH to complete the restore. APPH will copy log files if necessary from the APPS volume to the IA volumes to recover the application or database. Note that the EID software is not contacted for IA restores at all.

The backup data transmitted across the network as part of a differential block level image has a disk signature attached to beginning which has the appropriate information to virtualize the backup of a volume as a whole SCSI disk with a single valid partition.

During restore this read-only image is transformed into an iSCSI addressable read-write LUN by creating a sparse file backed by the image within the snapshot. This LUN file is persistent and can function as primary storage aggregating changes as well as original unchanged data from the backup image. The LUN can both be mounted as a stand-alone disk or part of a RAID set.

Error Recovery/Restartability:

N/A.

Restore Via Local Volume Rollback:

Volume rollback is only possible if restore happens to original location and all change journals since the time of backup exist. If these criteria are not made a full volume restore can be triggered (this is a de-generate case of volume rollback anyway) or the restore job fails. (Given the functionality of IA restores this may not need to be implemented at all.)

An option indicates that volume rollback is desired, in which case a VOLUME_ROLLBACK message is sent by the Protocol director to the Snapshot Handler (much like MAP_LUN). This message contains the backup jobid (which uniquely identifies the point-in-time of the backup) and the volume in question. If volume rollback is possible the Snapshot Handler locks and dismounts (applications hosted by the volume are shut down or off-lined by APPH) the volume in question and then takes a snapshot to flush the change journal. All change journals since the time of the snapshot that is being restored to, are logical-ANDed to create a bitmap file which is returned (the file name only) to the Protocol director. The Protocol director adds the bitmap file to the content file and passes this on to the EID software, which uses the bitmap file to restore only a set of blocks from the mapped LUN or across the network.

If traditional full volume restore is implemented then the allocation bitmap has to be passed to the Node software on the restore target from the EID node so that only the allocated blocks are copied. If network copy is used the EID node already knows which blocks to send.

After restore completes the volume is unlocked and re-mapped in the local namespace and applications/databases re-started and on-lined.

Restore Via Volume Rollback in a Thin Shared Configuration:

This mode of restore requires back-end storage support of single file or LUN rollback.

Volume locking and application shutdown happens on the restore target node mediated by the Snapshot Handler and APPH exactly like above.

During the initial handshake for Volume Rollback the restore target passes covering information for the target volume, (for example: D:=filerA,vol3/lun2) to the EID software. The EID software on determining that the back-end storage supports this feature and that the snapshot and the restore target LUN are logically related calls a back-end API (part of the plug-in interface) with two arguments—the snapshot that is the being restored from and the target logical entity or LUN that back-ends the volume on the restore target node.

Volume rollback on the back-end storage happens asynchronously and may take a while depending on the divergence between the live file-system and the snapshot (but should be quick since only local copy is involved). Once this completes the restore ends and applications can be re-started. (An example of this scenario is a single file LUN snapshot revert on an NAS device.)

Error Recovery/Restartability:

Full Volume Restores: Only important for large full volume restores. May be implemented by a restart mechanism similar to backup but with the checkpoint tracked by restore target Node software and communicated on a re-connect. Whether restore needs to be re-started after cancel by the DMA is outside the scope of this document.

Local Volume Rollback:

Error recovery should be un-necessary since the restore involves local copy. Re-startability after cancel/suspend may be desirable.

Application Supported Volume Rollback: Error recovery should be un-necessary but re-startability should be implemented if the back-end storage supports restarts.

ExpressDR Restore:

This is a special case of full volume restore where the restore target is running Linux. The Linux Node software may be driven by a modified version of jndmpc to work exactly like above, taking advantage of an iSCSI initiator if available on the custom Linux kernel. Error Recovery/Restartability would be essential in this situation. Additionally a standard mechanism needs to exist for browsing snapshots for ExpressDR backups of a given node. This should be part on an interface exposed by the EID software or the Snapshotg Handler on the EID Node. A snapshot directory listing may be sufficient with a pre-defined naming convention for snapshots, or a suitable interface may need to be defined for enumerating matching snapshots.

Error Recovery/Restartability:

This is very desirable for large restores and should be implemented in similar to full volume restores.

Security/Virtualization/Compliance/Self Provisioned Restore:

Nearlined data needs to be more secure than data on offline media (like tape) since data is live and accessible over the network given proper permissions or if a small set of accounts are compromised. One option would be to encrypt data that resides on nearline storage (Native file-system encryption could be used if available). This would slow down Instant Availability Restores but the added security may make it worthwhile. Double Protection to disk and/or tape, especially if they are for long term archival reasons are also prime candidates for encryption.

A few user accounts (Backup Express admin and root or Administrator on the EID node) protecting backups of a lot of machines consolidated on a single EID node, may not be secure enough for most enterprises. Multiple admins each having responsibilities/rights over a set of backup images may be more acceptable (In this situation the super-user would not necessarily have rights over all backup images). Some style of RBAC (Role based access control) may be implemented by using existing security mechanism on Windows 2003 or Linux 2.6.

Since complete images of application servers are stored as backup images on the EID node, these set of images (at various discrete points of time in the past) are a prime candidate for virtualization. Each client node or application server can be virtualized as it appeared at some point-in-time in the past using some off-the shelf or OS dependent virtualization software. The potential for secure virtualization of machine states (where only authorized persons have access to machine data) allows enterprises to implement just-in-time virtualization for administrator-less restores, compliance, analysis or other business salient reasons.

Regulation compliance or litigation discovery are important applications of the EID paradigm where data on the EID node could be virtualized to some point-in-time in the past for compliance inspection at very little additional cost. Double Protection to disk or tape targeted at specialized compliance appliances like secondary WORM storage or WORM tapes enable an end-to-end solution starting from backup, to near-term restore and long-term archival to meet compliance requirement.

Self Provisioned Restore refers to administrator-less data recovery where end users typically restore files without helpdesk or administrator mediation. This is possible as data is stored on the EID node preserving original file-system security. Once Instant Availability or other techniques are used to map volumes back to some well known location users can find and restore data using existing and familiar tools. (The Backup Express GUI may also be used to find and restore data without having to login as an administrator.) An intrinsic property of the EID architecture enables self-provisioned end-user restore and thus reduces TCO (Total Cost of Ownership) significantly.

Figure 3:
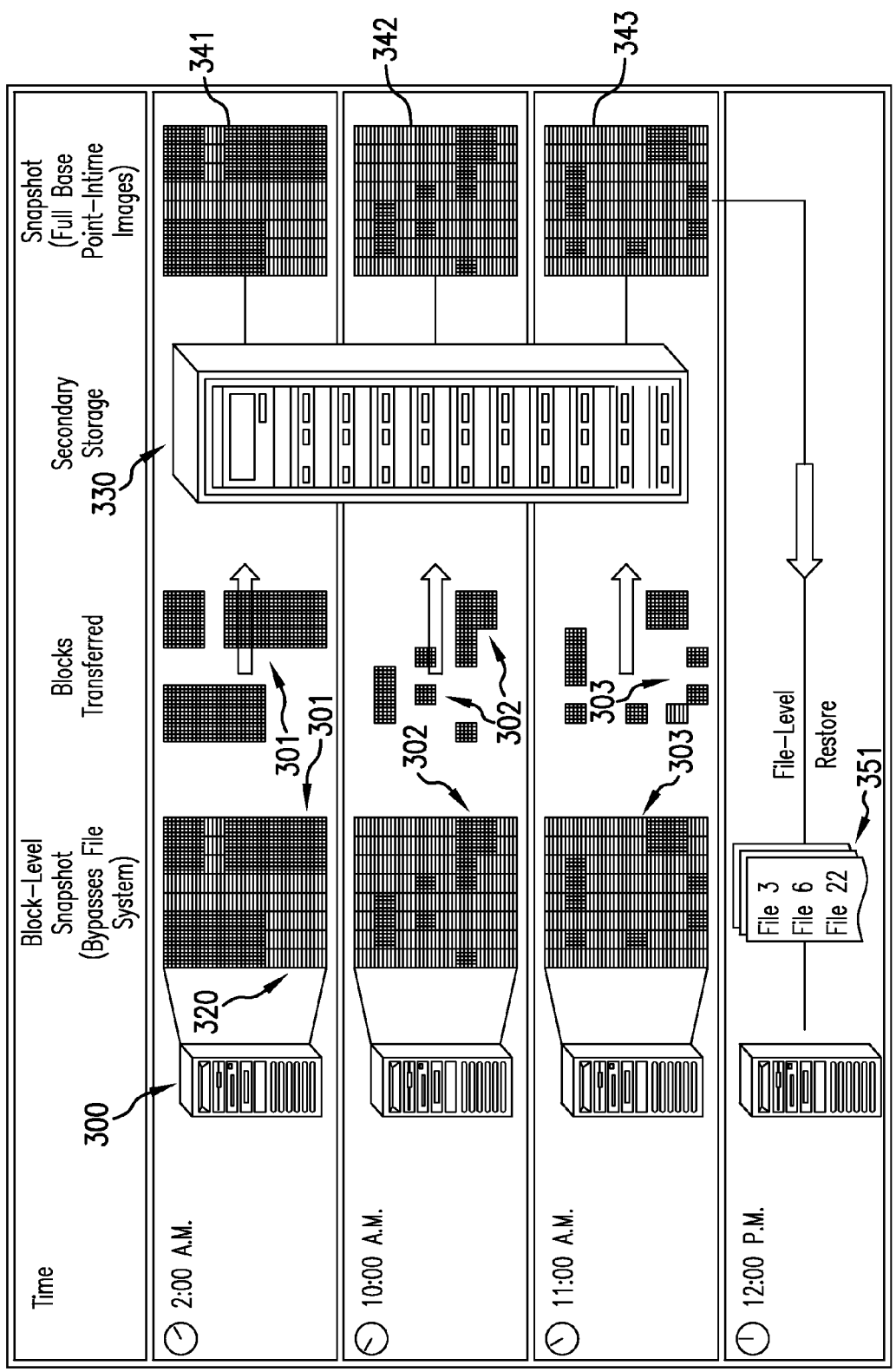
FIG. 3 is a block diagram showing a time line of operations that are part of a block-level incremental backup, followed by an exemplary file-level restore.

Example:

FIG. 3 shows block-level incremental backup and file-level incremental restore operations in greater detail than FIG. 2, in a manner that illustrates a number of the foregoing principles. The example shown involves the following events and operations:

2:00 a.m. A base backup is performed of primary system 300 during an early a.m. backup window. Note that only allocated blocks (301) are backed up. The unallocated blocks (320) are not transferred to the secondary storage unit 330, reducing elapsed time and secondary storage requirements. The snapshot (341) on the secondary represents all the data (volume/directories/files) on the primary at 2:00 a.m.

10:00 a.m. This is an incremental backup, since all backups after the base backup are automatically incremental. Note that only the blocks that have changed (302) since the base backup are transferred. The snapshot (342) on the secondary is a synthesized base backup image that represents all the data (volume, directories, files) on the primary at 10:00 a.m.

11:00 a.m. Only blocks that have changed (303) since the 10:00 a.m. backup are transferred. The snapshot on the secondary (343) represents all the data on the primary at 11:00 a.m.

12:00 p.m. The 11:00 a.m. snapshot (343) is selected from the backup instances (snapshots) displayed on the Backup Express restore screen. From this backup instance, three files (351) are selected for restore.

Double Protection

Double Protection protects first image backups to intelligent disk storage by backing them up to tape or disk, managing their life-cycle and providing direct restore from tape when first backups have expired or disk storage is unavailable.
Apm to Disk (APM2D):
First Backups:

1. Images of file systems are backed up to disk along with application specific meta-data (APPS). This data resides in a form that enables Instant Availability and/or Instant Virtualization.

2. File systems/OSs for which image backup is not supported are backed up to disk as files and reside under a destination directory as a point-in-time copy of the source file system.

Double Protection Explained:

Double Protection creates at least one (and as many as desired) virtual copy of the first backup to disk or tape. The crucial point here is that subsequent backups are identical untransformed copies. Since the first backups are frozen point-in-time images, copies can be made at any time in the future and still capture the original state of the file system. Twinning is not needed anymore since as many copies of an original backup can be made as soon as or whenever policy dictates. For supported applications, application consistent snapshots are saved to tape as if the tape backup was done at the time of the original first backup.

Presentation/Scheduling:

The GUI would present in a Double Protection screen a list of first backup jobs, which are candidates for double protection. This would look like a traditional image/or NDMP backup screen except for the fact that the left pane would be backup jobs. (Device selection may be avoided initially by implicitly selecting default cluster and mediapool for the containing nodegroup). The DP job would be saved as a NDMP job with the first backup jobname or a first backup jobid as part of the definition. The schedule would be simple—just a backup schedule like APM2D, no base incremental or differentials settings. DP jobs with a specific instance selected of a first backup job (i.e. jobid) would have no associated schedule and the job would be deleted after it is run. When job handler receives JOB_START and determines that this is a DP job would issue a CREATE_DP_JOB to the database specifying job name or job id as argument. The dB can obtain given the jobid (and by looking up the snapid) the backup document for the job. Given a job name the latest backup job id would be used to find the backup document for the job. The backup document contains the entire state of the first backup needed to be able to construct an NDMP job to tape identical to the original APM2D job. A one-to-one mapping of tasks in the original would be created in the DP_JOB resulting in an equal set of source statements.

For example a APM2D job with tasks C:, D:, APPS: would be translated to three tasks
/vol/vol1/.snapshot/snapname/qtree1,
/vol/vol1/.snapshot/snapname/qtree2, and
/vol/vol1/.snapshot/snapname/APPS-qtree.

CREATE_DP_JOB would return a temporary job name whose definition once obtained by job handler would allow the NDMP job to proceed. Once this job creates a copy to tape it would be as if a backup to tape was run at the original time of the disk backup.

The first backup jobid and taskids are needed for co-relating the DP jobs tasks with respect to the first backup. As part of CREATE_DP_JOB dB could pre-catalog the DP job creating catalog entries, which would be validated if an actual TASK_CATALOG came in.

The CREATE_DP_JOB could also be called by SVH when a necessary condition is triggered (running out of snapshots etc.). SVH could then run this job via JOB_START etc. following a backup or even before a backup.

Comprehensive scheduling incorporating both disk and tape and life-cycle management is outside the scope of this project and would be considered at a later stage.
Running DP Jobs:

Double Protection jobs are APM backups mediated via the EID software or external NDMP data servers (including proprietary NAS backup methods). The first backups could be image files or replicated directories. When the EID software backs these up it would recognize that DP backups are being made and back them up preserving original format if image or as logical backups if they are replicated directories. External agents would back up images or replicated directories in their native format (dump or tar).

In the event DP backups go to tape the legacy job handler path would be used. DP backups directed towards tertiary disks (Secondary to Tertiary Replication) would be handled by SSSVH or by some external agent (may involve simple scripts followed by a cataloging utility step)

In all cases no file history would be generated or captured since the identical file history for first backups makes this redundant.

All restores would be done via the Node software, regardless of originating format. (This would mean understanding external dump or tar format as needed.)
Archival Format/Compliance:

For long term archival or regulation needs DP backups may transform image backups to logical backups in some portable format like tar, cpio, or pax. These backups could go to WORM tapes or WORM drive to meet compliance requirement. Data would be restorable from this archive using file history saved during first backups. Direct Access Restore (DAR) would require re-saving file history with associated fh_info thus requiring file history generation during the double protection process.

Generally available utilities like tar etc. could be used to restore files from archival formats independent of Backup Express. The present design provides freedom to make and/or publish different archival formats.
Cataloging:

Each DP job would catalog as many tasks as the original backup in 'sscat'. New fields in sscat for original task and job ids would be added to track reference to the original job. (As part of this we could also add a snapid filed as part of sscat since this is a high level and crucial construct for first backup jobs) The DP jobs would have their own equivalent disk entries in sscat with path names reflecting secondary disk locations.

Example Sscat (Partial Columns):

| JOBID | TASKID | ORIGINAL JOBID* | JOBNAME | DISK |
|---|---|---|---|---|
| 1000055 | 1 | 0 | First backup | C: |
| 1000055 | 2 | 0 | First backup | D: |
| 1000055 | 3 | 0 | First backup | APPS: |
| 1000100 | 1 | 1000055 | Double P | /vol/vol1/qtreeC |
| 1000100 | 2 | 1000055 | Double P | /vol/vol1/qtreeD |
| 1000100 | 3 | 1000055 | Double P | /vol/vol1/qtreeAPPS |

Catalog Condensation and Job Expiration:

Since the first backups and subsequent DP backups are treated as separate jobs, each would have their own retention period. As first backups expire checks would be made to ensure that DP backups exist depending on policy. A warning may be issued or a DP job may be triggered at this point if a determination is made that there are unprotected first backups.

During condensation of primary jobs the catalog entries for the first backup would be retained and not deleted to preserve file history. The backup document would also be retained since this is necessary for application restore. The original job id is always retained as part of the promoted job, since this is what needs to be reflected a part of the restore browse. If multiple DP jobs exist for a given first backup they all contain the original job id, which would point to the original ssfile.

This process should be relatively simple since a single pass through the catalog table would be all that is required during condensation.

Restore Definition Generation:

Restore browse would return the $NDMPDATA from the original job instance for restore presentation. The RJI process would also be enhanced to include file history from the original ssfile to create a proper restore specification. The process would involve producing the tape windows involved in the DP backup along with the restore path names from the original ssfile. The root directories (the only thing cataloged) in ssfile for the DP backup would be ignored.

Restores: Fault Tolerant/Location Independent

DP tape backups being regular NDMP backups would show up under regular NDMP restores and can be used to restore directly to any compatible file system. In situations where the original secondary disk location is destroyed or corrupted these backups can be restored to original location to either recreate APM2D locations or to stage restores or effect virtualization. These restores can be handled by job handler as normal NDMP restores and can be part of a complete solution if no applications are involved.

A disaster recovery or full node backup of the secondary disk node is treated as a separate backup and may be used independently to restore the secondary in case of disaster.

The APM2D restore view would be unchanged, except for the fact that if DP backups exist for first backups they would not be displayed. For expired backups if DP backups exist they would show up and be presented as nearlined backups. The restore browse process would need to be augmented to return NDMP backup instances as APM2D backups. The restore selection would be passed on to SSSVH as today. (It is possible to create a NDMP restore job for application restore if job handler implements the restore side of APPH processing but this may be limited in terms of handling fault tolerance well.)

After APPH has been contacted for application restore and the restore file list determined the Protocol director would try to cycle through available disk destinations in order to satisfy the restore selection. If this fails (first backups have expired or disk destinations are unreachable) a NDMP restore job from tape would be constructed and run via JOB_START (presumably run by job handler). Once this successfully completes APPH will again be contacted and the restore completed.

"Lazy Mirroring"

A primary volume may be mirrored onto a secondary volume in accordance with the following procedure:

Mount the primary volume

Mount the secondary volume

Create a list of blocks to be copied from the primary volume to the secondary volume.

Write new blocks to both the primary and secondary volumes as they arrive

As blocks are written, remove those blocks from said list of blocks.

Traverse said list, and whenever bandwidth is available and convenient, copy blocks encountered as a result of such traversal from the primary volume to the secondary volume.

Continue until all blocks on said list have been copied.

The end result of the foregoing is that the secondary volume will be synchronized with the primary volume. This technique does not require stopping processing on the primary volume, nor does it impose any constraints on how much time can be taken to complete the copying process.

The "lazy mirroring" technique may be used, for example, to restore a physical primary device after an "instantly available" virtual device has been utilized, for example, after the failure of a primary device. The virtual device will be used temporarily, in that the data on it will be intact as of the point-in-time of its snapshot. However, the virtual device may be only a temporary solution, and the business will need to restore to a replacement primary device as soon as is feasible. "Lazy Mirroring" provides this capability in a manner that allows processing to continue uninterrupted, and allows the actual copying to proceed at its own pace while minimizing the load on other system components.

The "lazy mirroring" technique may also be advantageously used to "resilver" a mirror that has crashed or gone out of sync, while the primary mirror remains in production.

Moreover, the "lazy mirror" technique may be used anywhere where it is desired to copy a volume without stopping it, and to do so without engaging in extraordinary measures to save time.

Eliminating Redundancy in Backups and File Systems

Where a plurality of systems are being backed up in a backup operation, it is not uncommon that machines will have a large number of blocks that are identical to blocks on other machines involved in the backup. This may arise when multiple machines have installed on them the same operating system files, or the same applications or data files. It is redundant to store blocks having identical content multiple times. The redundancy concerns not only the redundant use of storage, but also the redundant use of bandwidth in transferring and storing the duplicate blocks.

Furthermore, even in a single file system it is not uncommon to have duplicate blocks as a result of duplication of files. This represents a redundancy as well.

Such redundancy may be eliminated in a backup context by taking a digest of every block written to the backup data set, and putting the digest data in a list or database.

Comparison of Block Digests is Preferably Performed on the Server Side.

If a node to be backed up has a large number of blocks that have changed and need to be backed up, it sends a list of those blocks with their digests to the backup server (it may also be the case that the node has created in advance lists of block digests for some other purpose, such as determining which of its own blocks have changed, such that those digests do not have to involve a separate step to create them).

The server then compares the block digests and requests those blocks for backup, which it has determined it does not already have (the list or database of blocks is stored in such a way as to facilitate rapid lookup using the digest as a key). The complete list of blocks sent by the remote node is saved (including those sent over plus those that the server determined it already had), as part of the backup catalog.

Preferably, if the node being backed up has only a small number of changed blocks, it simply sends them in that circumstance and skips the redundancy check.

A similar technique is employed for eliminating redundancy in a single file system. Each block to be written to the file system is digested, and compared against the digest of the blocks already stored (here again, the list or database of blocks is stored in such a way as to facilitate rapid lookup using the digest as a key). If the identical content block already exists on file system, the existing directory point is used and the duplicate block is not written. When a file are deleted, its blocks are deallocated from that file. If other files use the same block, those allocations remain in effect (a block is not "free" until no files reference it).

EXAMPLES

Fast Application Recovery

The following are a series of examples illustrating Fast Application Recovery as provided by the present invention.

Introduction to Examples

The examples illustrate the ability provided by the present invention to bring an application on-line quickly on a stand-by or original server by attaching to virtual storage created out of backup images on a filer, such as a NAS filer.

Consistent volume images from source nodes are nearlined with their associated application consistent state as backups, typically on NAS Filers. Users deal with application logical objects while the Backup Express agent creates hot base backups of physical objects that comprise the application. Forever Incremental Images ensure that only blocks changed since the last backup is copied to the filer without sacrificing the fact that all database backups are full. Since the application data and state is nearlined restore is affected very quickly by recovering a point in time copy of the application files, then bringing the application online and applying a small number of redo-log records. FAR recreates storage as it existed at the time of backup, establishing the physical relationships that the application logically expects and then recovering the application to a fully functional instance.

Mechanisms Illustrated:

Application restore is broadly a two step process: data file(s) need to be restored followed by application recovery (sometimes known as roll-forward recovery). The user selects an instance of backup or a PIT image (usually latest) depending on nature of disaster, type of user error or other business need. The first step is accomplished by creating addressable virtual storage (LUNs) on the fly on the filer from the user selected PIT volume images. These LUNs are then made visible to the target node in question. These are then attached as local disks on the restore target via iSCSI login to the filer. This process is near instantaneous since no actual data movement is involved. Once application data files are visible in the local namespace of the target node, applications are then programmatically recovered using appropriate application specific API. This may require application of additional log files which are obtained as necessary from the filer backup location. This brings the application instance up to the point in time of the backup. If current logs are available then roll-forward to the point of failure is possible. Since the backup was a snapshot backup, the application was in hot-backup mode for a very short time, only a few transactions need be applied to bring the database to a consistent state. The relative simplicity and quickness of these steps enable the application to come up in a matter of minutes after the FAR process is initiated. Compared with traditional restore FAR is orders of magnitude faster reducing application downtime from days or hours to minutes. FAR scales independently of the size of the data set.

Post-Restore:

FAR is not the end of the story. As FAR completes block change tracking may be enabled and local slice attachment may be done if needed. This enables background restore to proceed while the application is up and running. Incremental backups may be started from the point in time of restore since tracking of changed blocks is enabled. The application may eventually fail back to the original or another node with minimum downtime with all recent changes (since restore) preserved.

Requirements:
- Source and target nodes need to be running and licensed for the APM. (Applications if any may need to be licensed separately.)
- The NAS device or secondary storage unit needs to be licensed for iSCSI.
- Target nodes need iSCSI initiators software installed (iSCSI HBAs are also supported)
- Stand-by nodes need to be pre-configured with a minimal application install.
- Platform/application support includes Windows XP/Windows2000/Windows2003 and SQL Server 2000 (SP2+), Exchange 2000 (SP2+)/Exchange 2003, SQL Server 2005, Oracle and Linux.

Various scenarios and applications for rapid application restore and the lifecycle of data following restore are explored in the following sections:

Example 1

IV (Instant Verification) for APPs

Need: Restore is always a shot in the dark since backups are never really verified. Tapes are unreliable. Verification usually amounts to verifying internal consistency of the backup image. Application consistency and recoverability is a matter of chance.

Approach: IV for APPs verifies application backups near-instantly by restoring (FAR) to an alternate verification node or the original node when possible. The application is then recovered to complete the process. This can be scheduled so that every backup is always checked for integrity and no additional fire-drills need to be performed for recreating disaster scenarios.

PIT Image Used: Usually latest but could be images from the past if verification is batched.

Where Performed: Usually done on an alternate node where a minimal application installation is pre-created. The same node as the source for backup may be used if the application supports it. (For example: Exchange 2003 configured with Recovery Storage Group or SQL Server with the option of renaming the database being verified) Verification on the original node is usually not recommended since this places extra stress on the application server.

Modes:

Lightweight Verification: The application (usually database) restarts/recovers correctly thus verifying correctness of backup.

Comprehensive: If necessary further verification can be performed (more resource intensive) using application specific techniques to verify that all database pages are clean and/or logical objects function properly. (Imagine a database query which spans tables and the result is a clear vindication of database health)

Application Specific Notes:

Exchange: Mounting stores are usually a significant step. Further verification can be done using 'eseutil' on an alternate node.

SQL Server: Mounting databases are usually a significant verification step. Further verification can be done via 'DBCC' or by running SQL queries.

Follow-Up:

None. Verification is a transient operation and an iSCSI logoff or reboot will clear the machine state. IV for APPs may be configured so that the next verification run will clean up previous verification mappings. The machine state with mapped drives need not be preserved and thus no further backups are necessary of this alternate node.

Example 2

IA (Instant Availability) for APPs for Business Continuity

Need: Downtime is minimized to minutes. The most recent application backup state is restored. (Depending on frequency of backup very little data may be lost)

Approach: FAR brings back the application instance on a stand-by or the original node near-instantly, minimizing down time. The application state at the time of backup is restored. Changes made after the last backup is are lost unless the application logs are available (either salvaged from the original node or from some replicated location). If current application logs are available and subsequently applied the application can be rolled forward to the time of failure with no loss of data.

PIT Image Used: Usually latest but depending on reason for disaster (for example: virus attack) an image preceding the event.

Application Specific Notes:

Exchange 2003: Complicated scenarios like 'Dial Tone Recovery' involving creation of an empty database and then switching databases when recovery to the RSG (Recovery Storage Group) is done and then re-merging is no longer needed since FAR is quick and painless reducing application outage to a minimum.

SQL Server: Stand-by databases, replication, and/or log-shipping are expensive and administration intensive options for SQL Server availability. FAR is an option that is easy to deploy with reduced administration cost combining the power of fast backups and quick availability on demand.

Example 2a

With Online Restore

Need: Application data needs to be finally restored back to local or SAN attached storage. Using storage from secondary storage may be only a temporary option.

Where Performed: Usually to the original application node or a proximate node depending on nature of disaster and preventive setup.

Follow-Up (LAR): The application is online and users can start using the application within minutes. Restore continues in the background to a local disk slice while the application is up and running. After all data is restored to the local slice, the application is stopped or paused briefly and the iSCSI mappings are removed. Then the local slice is promoted to be the sole application disk. The application is resumed or restarted. The application is unavailable (if at all) only for a brief period at the end.

BAR—Regular backup schedule for protecting the application on the newly restore volume kicks in. (The cycle repeats if the application needs to be restored in the future)

Example 2b

Without Online Restore

Need: The reason that no background restore is needed is either that the stand-by node is temporary and degraded performance is adequate (fail-back may be in the offing once the original site has been re-constructed) or that the filer storing the backup image is powerful enough to host the application.

Redundant destination: A high end filer (possibly at a remote site) can mirror the backup images stored on the original backup destination (for example, to tertiary storage). This configuration lends itself to restore being redirected to the high-end filer and not the original filer. Background restore to a local slice is not needed in this case as the filer storage would be high-end and permanent.

Quality of Restored Storage:

A. Low—iSCSI mounts to secondary storage: Applications may be able to survive moderately performing storage over iSCSI, especially if this is a temporary situation and Fail Back is anticipated shortly once higher quality storage and nodes are repaired or independently restored.

B. High—iSCSI mount to high performance storage established by Secondary to Tertiary Replication, or copy to from original filer following backup: Applications will perform adequately and this may be a permanent solution. This does not preclude failback however.

Follow-Up: If needed the backup after restore (BAR) could continue from the target machine or a NAS block-level backup may be initiated since the storage has been effectively migrated to the NAS device. The LUNs on the filer may be cloned to break their dependency from the original snapshots since permanent storage on the filer has been established with its own storage life-cycle.

ERF (Eventual Rapid Failback) for APPs:

Applications may eventually fail back to the original node or to a separate recreated node in the following manner 1. Shutdown Application briefly on currently running node.
2. If a relationship was established between secondary and alternate storage and the original secondary is in the proximity of the final destination reverse the replication source and destination, resync, and update secondary from current storage. Else go to step 3. (This process works off the latest common snapshot and copies changes since then. This should complete quickly assuming fail back was initiated reasonably soon after the point of failure)
3. Perform FAR to desired node.
4. Application instance would be back to the state (with the latest changes) that it was on the stand-by node and normal operations could resume.

Example 3

Fine Grain Restore from Whole Application Backup

Need: For most applications fine grain restores are not possible from a backup of the entire application. Granular application object backups are unreliable and extremely resource intensive. Given the state of the art of current backup/restore solutions of fine-grain application objects performing a FAR for the application to an alternate instance (which completes very quickly) and then using application specific tools to recover fine-grain objects is an extremely attractive option.

Approach: FAR followed by application specific tools to drill down and examine application objects. These can then be merged into the original destination or extracted for external use.

PIT Image Used: Depends on when a fine grain object was deleted or was in an uncorrupted state.

Where Performed: Usually to an alternate instance on a different node or to the original node (depending on setup and need).

Follow-Up: Usually nothing as the need is temporary and the instance is torn down and iSCSI mappings undone.

Application Specific Notes:

Exchange 2000: Single mailbox restore without paying any backup penalties is possible using FAR and then using EXMERGE.EXE or other tools.

Exchange 2003: The powerful combination of Recovery Storage Group and FAR make single mailbox or even sub-mail box restore for fine-grain restore from any point in the past an extremely quick and painless option.

SQL Server: Table level restore—'bcp' or other tools may be used to restore tables from an alternate FARed instance.

Example 4

Instant Replica for Apps for Analysis, Reporting, and Data Warehousing

Need: Typically obtaining a second copy of data for analysis or reporting is a luxury afforded large businesses who have implemented expensive split mirror technology with plenty of disk space. With FAR not only is this feasible at a much lowered cost but can be done near instantly to multiple destinations. Businesses would be empowered to explore more analytical possibilities and gain a competitive edge.

Approach: Using FAR to one or more nodes as frequently as desired.

PIT Image Used: Usually latest but depending on analytical or business reasons some point in time in the past (perhaps data for last Christmas Sales)

Where Performed: To an alternate node. The original node still continues to run the line of business application.

What happens next (LAR)?: If the replica needs to have its own timeline or longevity it needs to be backed up. Backup continues with incremental changes from the restored copy.

Example 5

Alternate Node Restore for Tape Backup for Long Term Retention

Need: Additional protection and/or long term retention may require tape backup. Nearline images expire quickly thus tape backups are almost always necessary for long term retention.

Approach: Image backup of iSCSI mapped volumes to tape. The tape image can then restored at any granularity to any node at point in time in the future.

PIT Image Used: Usually staggered from the backup schedule and dictated by how many instances need to remain nearline.

Where Performed: Some tape connected to stand-by node. This could also be an IV for APPs node.

Follow-Up: Image backup to tape is performed of the FAR volume(s) (License needed). After successful backup iSCSI mappings are removed and the stage is set for the next cycle.

Example 6

FAR for Storage Migration

Need: There may be need to migrate direct attached or legacy SAN storage to block-oriented NAS Filer storage for cost, consolidation, performance, or manageability reasons.

Approach: Once a block-level backup has been done to the filer—the migration has already been seeded. The backup images may be copied or snap-mirrored to a high-end filer to further ease the process. FAR effectively completes the migration process.

PIT Image Used: Usually Latest.

Where Performed: To the new application node which will attach to the LUNs created on the filer.

Follow-Up: The LUNs will then be cloned (in the background) while the application is up and running to free them from the bondage of the snapshot containing them. The snapshots can then be re-cycled to reclaim space. Backup after restore (BAR) can then resume of the volumes backed by the LUN or of filer volumes or quota-trees containing the LUN.

Example 7

FAR4C-FAR for Compliance

Need: Legal reasons. Typically compliance involves expensive solutions involving proprietary hardware. Backup Express image backup to secondary WORM storage provides an affordable solution which can recreate a machine state sometime in the past instantly and accurately.

Approach: FAR to stand-by node either recreating application state or entire machine state.

PIT Image Used: Depends on whether this is needed for annual reports or on demand (which may be any point in time in the past depending on reason for scrutiny)

Where Performed: Any stand-by node.

Follow-Up: Usually transient and torn down after regulators have been satisfied. The whole machine state can be archived to WORM tapes if needed via Scenario 5 for offline examination or portable compliance.

A Further Example

Figure 4A:
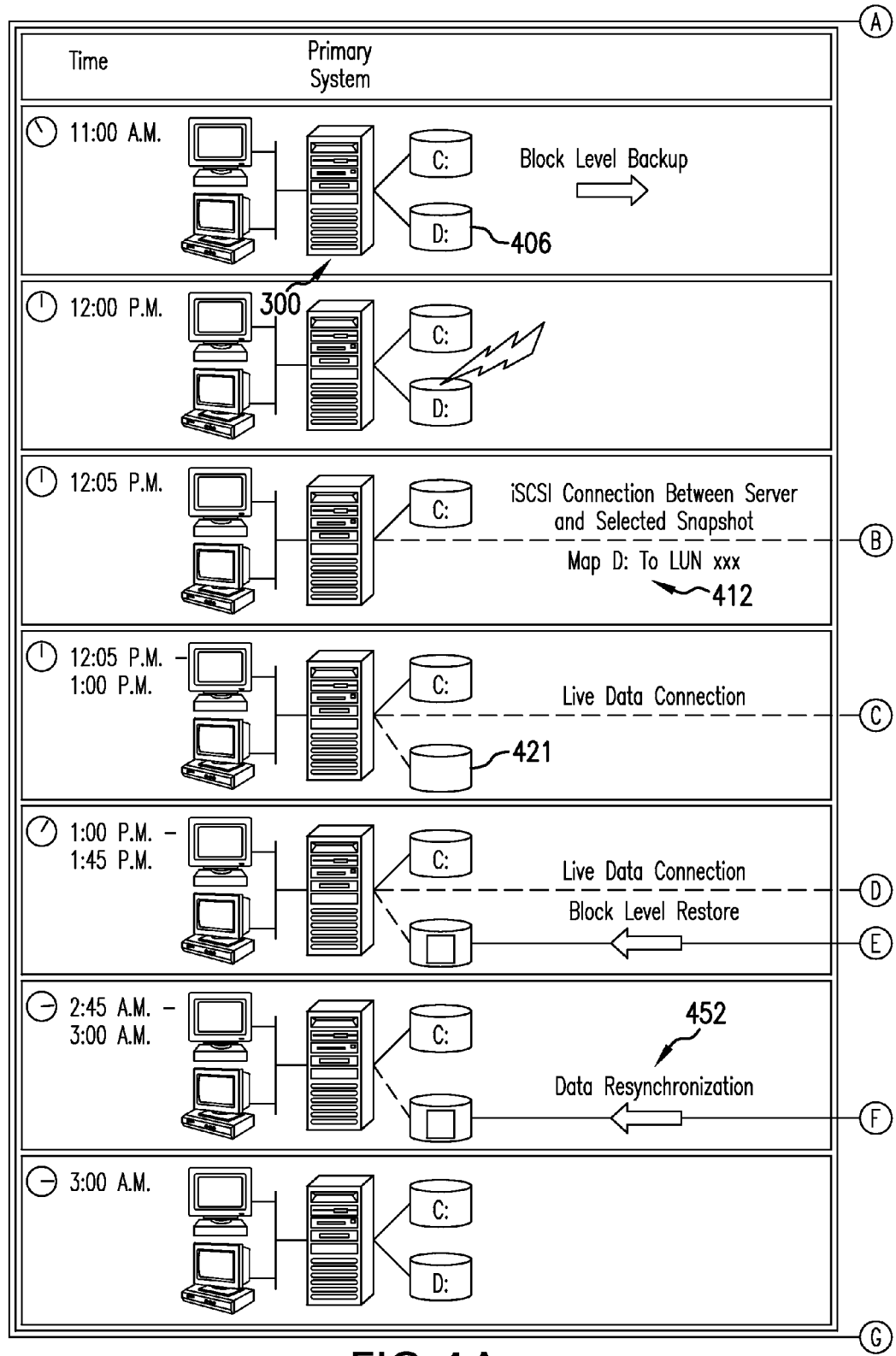
FIGS. 4(A & B) is a block diagram showing a time line of an example disaster recovery scenario involving incremental block-level backup, instant availability restore, and "lazy mirror" replication.
Figure 4B:
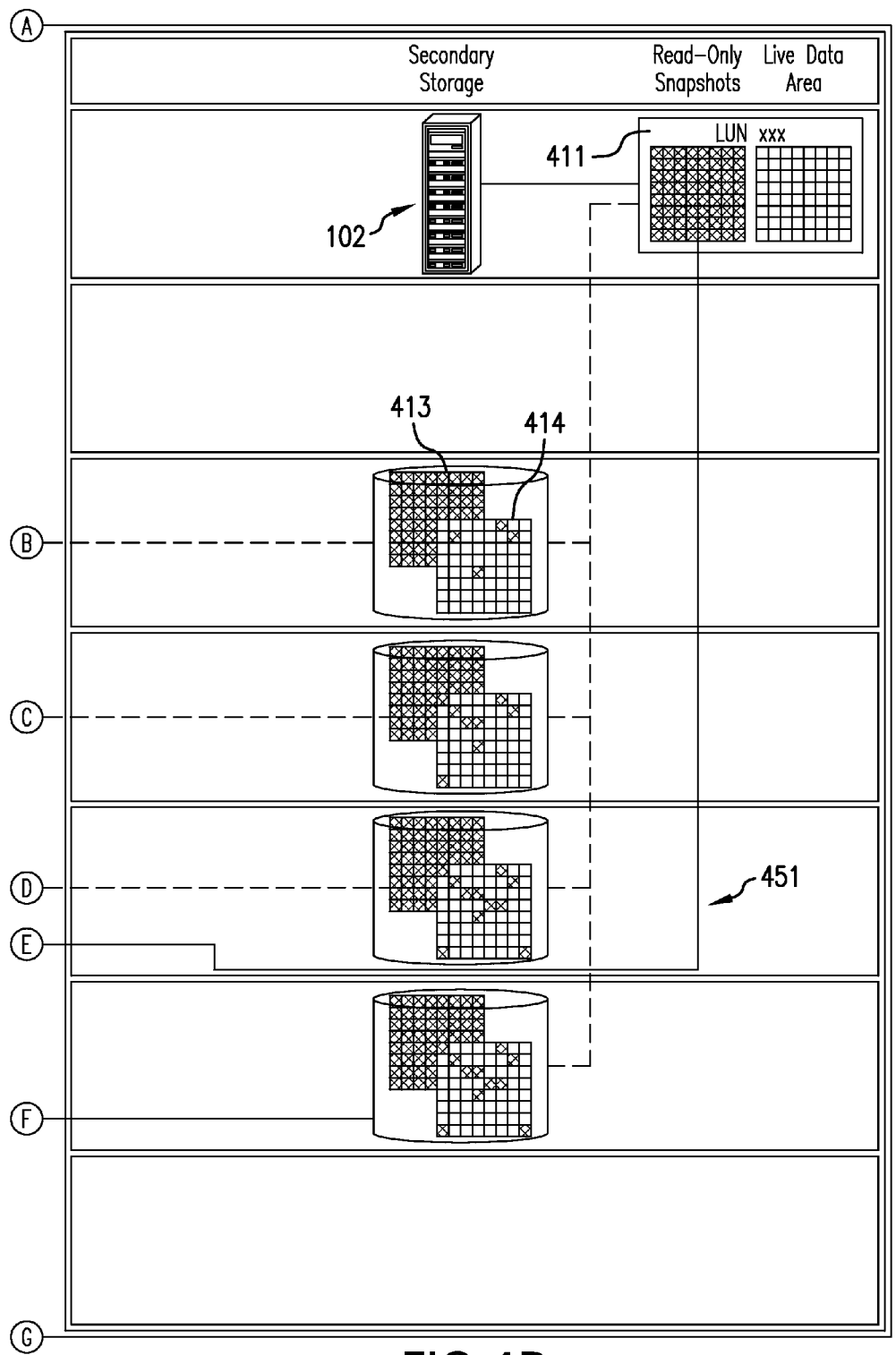

FIGS. 4(A & B) illustrates an instant availability and recovery scenario that utilizes Instant Availability to virtually eliminate business interruption during the recovery process:

11:00 a.m. Shows the last routine backup on the NAS 107 before disk failure on the primary node 300.

12:00 p.m. Volume D 406 fails. 12:05 p.m. Within minutes, the 11:00 a.m. backup instance, accessed through a Logical Unit Number (LUN) 411 on the secondary storage unit is mapped via iSCSI (412) to drive letter D. Business continues. The iSCSI connection to the secondary storage unit 107 is transparent to users. Note that data changes are stored in a "live data area" 414 on the secondary storage unit (square with white background blocks). The 11:00 a.m. backup instance itself 413 is read-only and does not change.

12:05-1:00 p.m. The failed disk 406 is replaced with new disk 421. Normal business use continues via the live iSCSI connection to the secondary storage unit 107.

1:00-1:45 p.m. The 11:00 a.m. backup instance is transferred (451) to the primary 300 and its new disk, 421. Business continues via the live iSCSI connection without interruption until the system is brought down at 2:45 a.m.

2:45-3:00 a.m. Administrator performs data resynchronization ("Lazy Mirror") (452). During this period, the system is unavailable to users. Instant Availability gives administrators the flexibility to perform the resynching (452) during an overnight maintenance period.

3:00 a.m. Recovery is completed. The Instant Availability connection is ended by remapping volume D to the new disk 421.

It is evident that the embodiments described herein accomplish the stated objects of the invention. While the presently preferred embodiments have been described in detail, it will be apparent to those skilled in the art that the principles of the invention are realizable by other devices, systems and methods without departing from the scope and spirit of the invention, as be defined in the following claims.

We claim:

1. A method for rapidly restoring an application from a set of one or more backup images to a target node, comprising:
    selecting said backup images;
    creating addressable virtual storage LUNs from said backup images on an on-demand basis;
    making the LUNs visible to the target node;
    attaching the LUNs as local disks on the restore target via iSCSI protocols; and
    programmatically recovering the application using application-specific APIs.

2. The method of claim 1, wherein programmatically recovering the application comprises:
    applying application-specific log files.

* * * * *